United States Patent

[11] 3,615,659

[72] Inventor Meyer Michael Weber
Milwaukee, Wis.
[21] Appl. No. 755,832
[22] Filed Aug. 28, 1968
[45] Patented Oct. 26, 1971
[73] Assignee Wisconsin Research Associates

[54] PREPARING A CHOCOLATE-FLAVORED BEVERAGE
10 Claims, No Drawings

[52] U.S. Cl. .................................................. 99/26, 99/23, 99/25
[51] Int. Cl. ................................................... A23g 1/00
[50] Field of Search ...................................... 99/23–26

[56] References Cited
UNITED STATES PATENTS

| | | | |
|---|---|---|---|
| 1,849,030 | 3/1932 | Zern et al. ................. | 99/25 |
| 2,117,682 | 5/1938 | Sanna ......................... | 99/25 |
| 2,296,180 | 9/1942 | Poshkow ..................... | 99/25 X |
| 2,515,794 | 7/1950 | Palmer ........................ | 99/26 X |
| 3,486,905 | 12/1969 | Hotelling .................... | 99/23 X |

*Primary Examiner*—Lionel M. Shapiro
*Assistant Examiner*—D. M. Naff
*Attorney*—Andrus, Sceales, Starke & Sawall

ABSTRACT: A sediment-free chocolate-flavored beverage is prepared by mixing a fat-free cocoa extract with water or milk and heating to 110–130° C., cooling to 5–20° C. to form a precipitate, separating the precipitate, packaging the beverage and sterilizing the packaged beverage.

PREPARING A CHOCOLATE-FLAVORED BEVERAGE

This invention relates to a method of making a cocoa extract for use in chocolate beverages, and to the method of making such a beverage.

Heretofore, it has been difficult to manufacture a fat-free cocoa extract for beverages which was stable and sediment-free. Various types of chemical extraction have been suggested, but most all of the resulting products were not completely fat-free and tended to become turbid in time. Extracts of cocoa may usually appear to be clear and fat-free, but when made into a beverage preparation, the small amounts of residual fat will rise to the surface of the bottle causing an objectionable appearance.

The present invention solves the above mentioned problems and provides a fat-free cocoa extract of unusual stability. In addition, the invention contemplates a method of manufacture of a chocolate beverage with the extract.

Other objects and advantages will appear in the course of the following description.

In accordance with the invention, powdered cocoa, preferably of the Dutch processed variety, is initially added to heated water. The amount of cocoa added to the water in the extraction process is not particularly critical and generally about 1 to 30 parts by weight, and preferably 10 to 20 parts by weight, of cocoa are added to 100 parts by weight of water.

The cocoa-water mixture is continuously agitated and the temperature the mixture is maintained above 60° C. and below the boiling point of water. In most instances the temperature is maintained at a value in the range of 60° to 80°C.

To solubilize the gelatinized cocoa starch, a starch-solubilizing enzyme, such as amylase enzyme, can be added to the heated cocoa-water mixture. Amylase enzymes derived from barley malt, fungal and bacterial sources can be employed and are added in an amount sufficient to solubilize the cocoa starch.

The heated mixture containing the enzymes is agitated for a period up to 30 minutes, and preferably about 10 minutes, during which time a substantial portion of the water-soluble constituents are dissolved in the water phase. The water solution is then separated from the undissolved material by filtering or centrifuging. The filtrate contains about 5 percent of dissolved solids as well as some melted fats and also contains about 15 percent of undissolved solids such as fibrous cocoa material.

The filter cake may be discarded and the remaining water solution is then cooled to a temperature whereat the melted fats will solidify, generally in the range of 5° to 20° C. and preferably about 15° C. The solidified fats are then separated from the solution by filtration or centrifugation and this filtration or centrifugation also serves to remove any other undissolved material. The resulting product is a cocoa extract substantially fat-free.

In order to produce a cocoa extract containing a higher percentage of water soluble components and a higher concentration of flavor, a countercurrent extraction system can be employed. In a countercurrent extraction system, the filter cake from the original filtration is added to an additional quantity of water at a temperature of 60° to 80° C. and refiltered or centrifugal. The cake from this second separation is again reworked and the resulting cake is discarded while the filtrate is mixed with a third filter cake.

The filtrate from the original filtration is added to a fresh quantity of powdered cocoa and substantially filtered to produce the third cake, which is mixed with the filtrate from the second filtration as previously described, and the resulting filtrate is again mixed with a fresh batch of cocoa and filtered to produce the final filtrate or extract. This counter current extraction system is of a conventional type and increases the concentration of soluble constituents, so that generally the final extraction has a solids content of about 10 percent to 30 percent by weight and usually about 15 percent by weight.

In a countercurrent extraction system, it is convenient to separate out the fat components after the final extraction has been performed. Thus, the final filtrates can either be combined or separately cooled and filtered to remove the solidified fats.

It has been found that a loss of flavor results if the original extraction or filtrate is evaporated to produce the desired solids content of about 10 percent to 30 percent. This loss of flavor is apparent even though low temperature, vacuum evaporation is sued in which the temperature of evaporation is lower than the temperature of the water used in the extraction process. Thus, it is preferred to increase the concentration of solids in the extract by multiple or countercurrent extraction rather than evaporation.

While the above description has shown water to be the solvent for the extraction process, it is contemplated that aqueous solutions containing other miscible, nontoxic solvents such as ethyl alcohol, glycerine or propylene glycol, can also be used.

If desired, the extract may be sterilized to prevent spoilage during storage and shipment. Elevated temperatures may tend to destroy or vaporize important cocoa flavor components, so it is desirable, therefore, to seal the extract in a closed container to prevent loss of flavor during sterilization. It has been found that sterilization can be readily accomplished by heating the extract in a closed pressure vessel, such as an autoclave, for a period of 15 minutes at about 121°C.

The cocoa extract produced as described above may then be utilized in making a chocolate drink. The extract is diluted with water, and salt, sugar and vanilla are generally added to accentuate the chocolate flavor. To form a substantially sediment-free bottled beverage, it has been discovered that the diluted extract should be heated and cooled in bulk prior to bottling. On dilution at room temperature, the extract is relatively clear, but if the diluted extract or beverage is then bottled and sterilized, a precipitate will form during cooling from the sterilization temperature. This precipitate will not go back into solution at room temperature, and the resulting precipitate or sediment detracts from the appearance of the beverage. Therefore, to eliminate the precipitate in the bottled product, the product is heated in bulk after dilution to a temperature above 80° C. and below the temperature which will result in flavor changes in the cocoa. Preferably, the product is heated to a temperature of about 110° to 130° C. for a period of 10 to 20 minutes. On heating, soluble constituents in the extract solution are converted to insoluable products, and on cooling the insoluble products will form a precipitate which is off-white in color and is believed to be of an inorganic nature. After settling for a period of about 24 hours, the precipitate is separated from the clear beverage by decanting, filtering or centrifuging. The beverage can then be bottled and sterilized by conventional procedures.

It has also been found that better flavor retention of the cocoa is achieved if the sugar is added to the beverages after the beverage has been heated and the precipitate removed. For some reason, the presence of the sugar during the heating may tend to produce a loss of cocoa flavor.

The bottled cocoa-flavored beverage generally has the following composition in weight percent:

| | |
|---|---|
| cocoa extract solids | 1.0–1.55% |
| salt | 0.05–0.1% |
| sugar | 10.0–15.0% |
| vanilla or vanillin | 0.01–0.015% |
| water | balance |

Since the extract is free of undissolved solids, the resulting beverage is clear and does not possess a typical milk chocolate appearance. Because of this it may be advisable in some cases to add a clouding agent to the beverage to obtain a stable milky or cloudy appearance, Conventional clouding agents such as brominated oils, or skim milk powder, whey powder, or dried buttermilk can be used for this purpose.

A chocolate milk flavored drink can also be produced by adding liquid unconcentrated skim milk or skim milk powder to the diluted cocoa extract. The skim milk is added in an amount such that the resulting bottled or packaged beverage contains from 1.0 to 5.0 percent by weight of milk solids.

The chocolate milk flavored beverage is prepared in the same manner previously described. After diluting the cocoa extract with water and adding the skim milk, salt and vanilla, the mixture is heated in bulk to a temperature above 80° C., and preferably 110° to 130° C., and cooled. As previously described, a precipitate forms on cooling, and after a period of settling the precipitate is removed, sugar is then added and the resulting beverage is bottled and sterilized by standard procedures.

The beverage generally has a pH in the range of 5.9 to 6.5, and to insure that the pH does not fall below this range a small amount of a buffering agent such as sodium or potassium carbonates, bicarbonates, phosphates or bicarbonates can be added to the beverage. If the pH falls below 5.7 it might affect the stability of the milk in the beverage.

The chocolate milk flavored beverage generally has the following composition in weight percent when bottled:

| | |
|---|---|
| cocoa extract solids | 1.0–1.05% |
| salt | 0.05–0.1% |
| sugar | 10.0–15.0% |
| vanilla or vanillin | 0.01–1.015% |
| milk solids | 1.0–1.5% |
| buffering agent | 0.05–0.20% |
| water | balance |

In some instances, it may be desired to carbonate either the chocolate-flavored beverage or the chocolate milk flavored beverage. Carbonation tends to reduce the pH of the beverage and if the pH is much below 5.7 the beverage will have an undesirable acidic flavor. Thus the pH of the beverage should be maintained in the range of 5.7 to 6.5 by the addition of a sufficient amount of a buffering agent. The buffers are alkaline materials such as sodium or potassium carbonates, phosphates, bicarbonates, or the like. While it is not necessary to add the buffering salts to adjust the pH to a value of 6.0, the titratable acidity must be reduced by the addition of the proper amount of buffering salt.

To accentuate the cocoa flavor in the beverage, the volume of carbon dioxide used in producing the carbonated beverage should not exceed about 2 volumes per volume of beverage, and should preferably be between 1 and 1.5 volumes.

The cocoa extract produced by the invention can also be used in commercial soft drink vending machines, in which a premixed extract syrup is automatically mixed with carbonated water at the time of sale.

The following examples illustrate the preparation of the cocoa extract;

EXAMPLE NO. 1

Five hundred pounds of water was heated to 80° C. and 100 pounds of finely ground cocoa was added to the water, bringing the temperature of the mixture down to 70° C. Thirty-thousand SKB units of bacterial amylase enzyme were added to the heated mixture, to solubilize the cocoa starch and the mixture was agitated for 10 minutes. Subsequently, the mixture was centrifuged and the filtrate and cake were treated by a counter current extraction system.

The resulting extract contained 15 percent dissolved solids and was then cooled to a temperature of 15.5° C. causing the melted fats to solidify. The solidified fats were separated by centrifuging and the resulting final extract was clear and dark brown in color.

The extract was placed in a sealed container and sterilized by heating to a temperature of 121° C. for 15 minutes.

EXAMPLE NO. 2

A cocoa extract was prepared by the countercurrent extraction described in example 1. The extract was cooled to 15° C. and polish-filtered using diatomaceous earth as the filter aid to remove the solidified fats. The resulting extract was clear, brown in color and contained 10 percent solids.

The following examples illustrate the preparation of beverages using the cocoa extract of the invention:

EXAMPLE NO. 3

The cocoa extract of example 1 was mixed with sodium chloride, vanilla and water and heater to a temperature of 120° C. for 15 minutes. The mixture was cooled to room temperature, and allowed to stand without agitation for 24 hours to permit the precipitate to settle. The clear liquid was decanted and sterilized sugar added to the liquid. The volume of the liquid was adjusted by the addition of water so that the liquid had the following composition in weight percent:

| | |
|---|---|
| Cocoa extract solids | 1.0% |
| NaCl | 0.1% |
| Sugar | 10.0% |
| Vanilla | 0.015% |
| Water | Balance |

The beverage was bottled and sterilized by heating to 170° C. for 12 minutes. The sterilized bottled beverage showed no evidence of sediment formation after standing for 30 days.

EXAMPLE NO. 4

A carbonated chocolte-flavored beverage was prepared in accordance with the procedure of example 3 except that the cocoa extract from example 2 was employed and sodium bicarbonate was added as a buffering agent.

The beverage after heating, removal of the precipitate and addition of the sugar, had the following formulation in weight percent:

| | |
|---|---|
| Cocoa extract solids | 1.0% |
| NaCl | 0.1% |
| Sugar | 10.0% |
| Vanilla | 0.015% |
| Sodium bicarbonate | 0.20% |
| Water | Balance |

The beverage was bottled and carbonated to provide a carbonation value of 1.5 volumes of carbon dioxide per volume of beverage. After bottling the sealed bottle was sterilized by heating to 107° C. for 12 minutes.

EXAMPLE NO. 5

A chocolate milk flavored beverage was prepared in accordance with the procedure of example 3, except that unconcentrated skim milk was added to the mixture before heating.

The beverage after heating, removal of the precipitate and addition of the sugar, had the following formulation in weight percent:

| | |
|---|---|
| Cocoa extract solids | 1.25% |
| NaCl | 0.1% |
| Sugar | 10.0% |
| Vanilla | 0.015% |
| Sodium bicarbonate | 0.2% |
| Milk solids | 2.5% |
| Water | balance |

The beverage was bottled and sterilized at a temperature of 107° C. for 12 minutes. The bottled beverage had typical chocolate milk appearance.

After standing for a period of 30 days, no precipitate or sediment was noted in the bottle.

The present invention provides a fat-free cocoa extract of unusual clarity and having superior flavor characteristics which can be used to prepare a wide variety of chocolate beverages. Due to the novel heat treatment prior to bottling and sterilization, the resulting beverage is substantially sediment-free and can be stored without the formation of precipitates or sediment.

Various modes of carrying out the invention are contemplated as being within the scope of the following claims particularly pointing out and distinctly claiming the subject matter which is regarded as the invention.

1. A method of preparing a substantially sediment-free chocolate-flavored beverage, comprising the steps of extracting the water soluble material from cocoa at a temperature below 80° C. to provide a clear substantially fat-free cocoa extract containing from 10 percent to 30 percent by weight of solids, mixing the cocoa extract, containing dissolved constituents capable of forming insoluble substances on cooling from an elevated temperature above 80° C., with water to provide a beverage, heating the beverage in bulk to a temperature in the range of 110° to 130° C., cooling the beverage from said temperature to a temperature of 5° C. to 20° C. to precipitate said substances, separating said precipitated substances from the beverage, packaging the resulting beverage, and sterilizing the beverage in the package at a temperature in the range of 107° to 121° C.

2. The method of claim 1, and including the step of mixing skim milk said cocoa extract and water prior to heating.

3. The method of claim 2, wherein said beverage contains from 1.0 to 1.5 percent by weight of cocoa extract solids and 1.0 to 5.0 percent by weight of milk solids.

4. The method of claim 1, wherein said beverage is maintained at said temperature in the range of 110° to 130° C. for a period of 10 to 20 minutes.

5. The method of claim 1, wherein said beverage after cooling is permitted to stand without agitation for a period of at least 24 hours to affect settling of the precipitated substances.

6. The method of claim 1, wherein the fat is removed from the cocoa by initially heating an aqueous dispersion of cocoa to a temperature above 60° C. and below the boiling point of said aqueous phase to cause the cocoa starches to gelatinize, separating the heated mixture into an aqueous filtrate and an undissolved solids cake, said filtrate containing dissolved solids and melted fats, cooling the filtrate to a temperature in the range of 5° to 20° C. to cause the fat therein to solidify, and subsequently separating the fats from the colled filtrate.

7. The method of claim 3, and including the step of adding a buffering agent to the beverage to maintain the pH of the packaged beverage in the range of 5.7 to 6.5.

8. The method of claim 1, and including the step of adding carbon dioxide to the beverage after separating said constituents in a ratio of 1 to 2 volumes of carbon dioxide per volume of beverage.

9. The method of claim 1, and including the step of adding sugar to said extraction and water after separating of said substances.

10. The method of claim 9, wherein the packaged beverage contains from 1.0 to 1.5 percent by weight of cocoa extract solids and 10.0 to 15.0 percent by weight of sugar.

UNITED STATES PATENT OFFICE
CERTIFICATE OF CORRECTION

Patent No. 3,615,659      Dated October 26, 1971

Inventor(s) MEYER MICHAEL WEBER

It is certified that error appears in the above-identified patent and that said Letters Patent are hereby corrected as shown below:

Column 2, line 8, Cancel "sued" and substitute therefor ---used---, Column 2, line 61, Cancel "1.0 - 1.55%" and substitute therefor ---1.0 - 1.5%---, Column 2, line 64, Cancel 0.01 - 0.015%" and substitute therefor ---0.01 - 1.015%---, Column 3, line 21, Cancel "1.0 - 1.05%" and substitute therefor ---1.0 - 1.5%---, Column 5, line 26, Cancel "1" and substitute therefor ---4---, Column 6, line 11, Cancel "colled" and substitute therefor ---cooled---.

Signed and sealed this 11th day of July 1972.

(SEAL)
Attest:

EDWARD M. FLETCHER, JR.
Attesting Officer

ROBERT GOTTSCHALK
Commissioner of Patents